US012644582B2

(12) United States Patent
Ernst et al.

(10) Patent No.: US 12,644,582 B2
(45) Date of Patent: Jun. 2, 2026

(54) LIGHTING FIXTURE

(71) Applicant: Astera Manufacturing Limited, Shenzhen (CN)

(72) Inventors: Norbert Ernst, Shenzhen (CN); Simon Canins, Shenzhen (CN)

(73) Assignee: Astera Manufacturing Limited, Shenzhen (CN)

( * ) Notice: Subject to any disclaimer, the term of this patent is extended or adjusted under 35 U.S.C. 154(b) by 0 days.

(21) Appl. No.: 18/896,851

(22) Filed: Sep. 25, 2024

(65) Prior Publication Data

US 2025/0320983 A1 Oct. 16, 2025

(30) Foreign Application Priority Data

Apr. 11, 2024 (CN) ......................... 202420752279.8

(51) Int. Cl.
*F21V 17/00* (2006.01)
*F21V 17/06* (2006.01)
(Continued)

(52) U.S. Cl.
CPC ............ *F21V 17/005* (2013.01); *F21V 17/06* (2013.01); *F21V 17/162* (2013.01); *F21V 17/18* (2013.01); *F21Y 2115/10* (2016.08)

(58) Field of Classification Search
CPC ...... F21V 17/005; F21V 17/06; F21V 17/162; F21V 17/18
See application file for complete search history.

(56) References Cited

U.S. PATENT DOCUMENTS

| | | | | |
|---|---|---|---|---|
| 8,328,582 B1 * | 12/2012 | Carley | G08C 17/02 | 439/642 |
| 8,567,999 B2 * | 10/2013 | Paik | F21V 29/83 | 362/365 |

(Continued)

FOREIGN PATENT DOCUMENTS

| | | |
|---|---|---|
| CN | 201359262 Y | 12/2009 |
| CN | 213810239 U | 7/2021 |

(Continued)

OTHER PUBLICATIONS

EESR of the counterpart European patent application No. 24202806.6 issued on Jun. 17, 2025.

*Primary Examiner* — Bryon T Gyllstrom
(74) *Attorney, Agent, or Firm* — IDEA Intellectual Limited; Sam T. Yip

(57) ABSTRACT

This application provides a lighting fixture including a first diffuser, a mounting base and an installation key. The first diffuser includes a mounting portion connected to the mounting base through cooperation of a locking portion and a locking groove. Either mounting portion or mounting base is provided with a locking notch, and the installation key can slide relative to mounting portion. In a locked state, the installation key is positioned at locking notch, locking portion is positioned in locking groove, and the first diffuser is locked to the mounting base. In an unlocked state, the installation key disengages from locking notch, allowing mounting portion to rotate about mounting base to disengage locking portion from locking groove and first diffuser is unlocked from mounting base. The first diffuser can be installed on or detached from the mounting base through the installation key, making installation convenient.

19 Claims, 9 Drawing Sheets

(51) Int. Cl.

| | |
|---|---|
| ***F21V 17/16*** | (2006.01) |
| ***F21V 17/18*** | (2006.01) |
| ***F21Y 115/10*** | (2016.01) |

(56) References Cited

U.S. PATENT DOCUMENTS

| | | | | |
|---|---|---|---|---|
| 9,470,373 | B2 * | 10/2016 | Hiller | F21K 9/232 |
| 10,047,913 | B1 | 8/2018 | Hsu | |
| 10,139,095 | B2 * | 11/2018 | Yoder | F21V 7/28 |
| 10,429,051 | B1 * | 10/2019 | Tran | F21V 29/51 |
| 2007/0165415 | A1 | 7/2007 | Henrici et al. | |
| 2011/0292653 | A1 * | 12/2011 | Hofmann | F21K 9/232<br>29/25.01 |
| 2012/0300455 | A1 * | 11/2012 | Breidenassel | F21V 29/77<br>362/249.02 |
| 2023/0143898 | A1 | 5/2023 | Xu | |
| 2023/0373405 | A1 * | 11/2023 | Wilson | B60Q 1/28 |
| 2024/0210013 | A1 * | 6/2024 | Wu | F21K 9/235 |

FOREIGN PATENT DOCUMENTS

| | | | |
|---|---|---|---|
| CN | 214700320 | U | 11/2021 |
| EP | 2677231 | A1 | 12/2013 |
| EP | 3916288 | A1 | 12/2021 |
| JP | 2015111497 | A | 6/2015 |

* cited by examiner

LIGHTING FIXTURE

CROSS-REFERENCE TO RELATED APPLICATIONS

The present application claims priority from the China Patent Application No. 202420752279.8 filed Apr. 11, 2024, and the disclosure of which is incorporated herein by reference in its entirety.

FIELD OF THE INVENTION

This application relates to the field of lighting technology, particularly to the design of a lighting fixture.

BACKGROUND OF THE INVENTION

In the current field of lighting technology, whether it involves traditional incandescent lamps, fluorescent lamps, or LED lamps, replacing the lampshade typically requires replacing the entire lighting fixture. This results in increased costs.

SUMMARY OF THE INVENTION

It is an objective of the present invention to provide a lighting fixture having a lampshade which can be installed on or detached from mounting base using an installation key, making the installation convenient.

In accordance with a first aspect of the present invention, the lighting fixture provided in this application includes a first diffuser, a mounting base, and an installation key; the first diffuser includes a mounting portion connected to the mounting base by coupling a locking portion and a locking groove; the installation key is configurable to slide relative to the mounting portion to switch between a locked state and an unlocked state; when the installation key is in the locked state, the installation key is positioned at a locking notch configured in the mounting portion or the mounting base, the locking portion is positioned in the locking groove so that the first diffuser is locked to the mounting base; and when the installation key is in the unlocked state, the installation key is unlocked from the locking notch to allow the mounting portion to rotate about the mounting base to disengage the locking portion from the locking groove so that the first diffuser is unlocked from the mounting base.

In some embodiments, an inner wall surface of the mounting base is provided with a release groove communicable with the locking groove; the locking portion is formed on an outer wall surface of the mounting portion; the mounting base includes a first end surface facing the first diffuser; the locking groove and the first end surface are spaced apart; the release groove passes through the first end surface; the locking portion is configurable to rotate with the mounting portion about the mounting base to move between the locking groove and the release groove; and when the locking portion moves to the release groove, the first diffuser can be detached from the mounting base.

In some embodiments, the mounting portion is further provided with an avoidance notch communicable with the locking notch; in the locked state, the installation key is positioned at the locking notch, and the mounting portion is locked to the mounting base; and in the unlocked state, the installation key is positioned at the avoidance notch to allow the mounting portion to rotate about the mounting base.

In some embodiments, the mounting portion is further provided with a stop strip opposite to the locking notch along a circumferential direction of the mounting portion; when the installation key is positioned at the locking notch, the stop strip abuts the installation key, the first diffuser is locked to the mounting base; and when the installation key is disengaged from the locking notch, movements of the stop strip and the installation key are independent, allowing the mounting portion to rotate about the mounting base.

In some embodiments, the mounting base is provided with a mounting notch along a sliding direction of the installation key relative to the mounting portion, wherein the mounting notch passes through the inner and outer wall surfaces of the mounting base in a radial direction; the inner wall surface of the mounting base is provided with a receiving groove communicable with the mounting notch, wherein the receiving groove has a width greater than a width of the mounting notch; and the installation key includes an installation portion and a body connected to the installation portion, wherein the installation portion is configurable to slide through the mounting notch; and the body is slidably disposed in the receiving groove and configurable to be inserted into or disengaged from the locking notch.

In some embodiments, the lighting fixture further includes an elastic element having two ends respectively connected to the installation key and the mounting base; and the elastic element provides a preloading force to the installation key to drive the installation key to move back to an original position.

In some embodiments, the installation key and the mounting base are connected through a connecting protrusion and a connection groove; and the elastic element has one end fixedly fitted over the connecting protrusion; and has another end fixedly connected to a bottom surface of the connection groove.

In some embodiments, the lighting fixture further includes a positioning member sequentially stacked and connected with the mounting portion and the mounting base; and the positioning member and the installation key are connected by coupling a limiting groove and a limiting portion to restrict a sliding travel of the installation key relative to the mounting base.

In some embodiments, the mounting base further includes a connecting element configured on the inner wall surface of the mounting base; and the positioning member and the connecting element are connected by coupling a positioning protrusion and a positioning groove to prevent the positioning member from rotating about the mounting base.

In some embodiments, the lighting fixture further includes a second diffuser; the first diffuser is fitted over the second diffuser; and the second diffuser and the positioning member are connected by coupling a clamping groove and a clamping portion to position the second diffuser on the positioning member.

The lighting fixture provided in this application, comprising: a first diffuser, a second diffuser, a mounting base, an installation key, an electrical connection base and light engine assembly; the light engine assembly is configured to fix on the electrical connection base and the mounting base is arranged on the electrical connection base; the second diffuser is configured to fix on the mounting base to cover the light engine assembly; the first diffuser is configured to detachably connect to the mounting base through the installation key.

In some embodiments, the first diffuser includes a mounting portion connected to the mounting base by coupling a locking portion and a locking groove; the installation key is configurable to slide relative to the mounting portion to switch between a locked state and an unlocked state; when in the locked state, the installation key is positioned at a locking notch formed in the mounting portion or the mounting base, and the locking portion is engaged in the locking groove, thereby locking the first diffuser to the mounting base; and when in the unlocked state, the installation key is unlocked from the locking notch to allow the mounting portion to rotate about the mounting base to disengage the locking portion from the locking groove so that the first diffuser is unlocked from the mounting base.

In some embodiments, the locking portion formed on the outer surface of the mounting portion, the locking groove formed on the inner surface of the mounting base; a release groove in the inner surface of the mounting base, communicable with the locking groove; the locking portion is configurable to rotate with the mounting portion about the mounting base to move between the locking groove and the release groove; and when the locking portion moves to the release groove, the first diffuser can be detached from the mounting base.

In some embodiments, the locking notch formed on the mounting portion and the mounting portion is further provided with an avoidance notch communicable with the locking notch; in the locked state, the installation key is positioned at the locking notch, and the mounting portion is locked to the mounting base; and in the unlocked state, the installation key is positioned at the avoidance notch to allow the mounting portion to rotate about the mounting base.

In some embodiments, the mounting portion is further provided with a stop strip opposite to the locking notch along a circumferential direction of the mounting portion; when the installation key is positioned at the locking notch, the stop strip abuts the installation key, the first diffuser is locked to the mounting base; and when the installation key is disengaged from the locking notch, movements of the stop strip and the installation key are independent, allowing the mounting portion to rotate about the mounting base.

In some embodiments, the lighting fixture further includes an elastic element having two ends respectively connected to the installation key and the mounting base; and the clastic element provides a preloading force to the installation key to drive the installation key to move back to an original position.

In some embodiments, the installation key and the mounting base are connected through a connecting protrusion and a connection groove; and the elastic element has one end fixedly fitted over the connecting protrusion; and has another end fixedly connected to a bottom surface of the connection groove.

In some embodiments, the volume the first diffuser is bigger than that of the second diffuser, and the second diffuser includes a vertical portion and a portion of dome shape, the vertical portion including inner teeth profile for better diffuse.

In some embodiments, the light engine assembly includes a LED and a reflector both mounted to a printed circuit board and the reflector is beneath the LED; the portion of dome shape is above top of the light engine assembly.

BRIEF DESCRIPTION OF THE DRAWINGS:

To illustrate the technical solutions presented in the embodiments of the present invention more clearly, a brief introduction to the accompanying drawings is provided below. Although the drawings described represent some embodiments of the utility model, it should be understood that those skilled in the art should be able to acquire other drawings based on these drawings without substantive creative effort.

REFERENCE NUMERALS IN THE DRAWINGS

100: lamp; 101: center line; 10: first diffuser; 11: mounting portion; 111: outer wall surface; 112: inner wall surface; 113: first connecting section; 114: locking portion; 115: locking notch; 116: avoidance notch; 117: stop strip; 12: casing; 20: mounting base; 201: first side wall surface; 202: second side wall surface; 203: second connecting section; 204: locking groove; 205: release groove; 207: first end face; 208: mounting notch; 209: receiving groove; 211: annular part; 2111: connecting groove; 213: first step groove; 215: connecting element; 2151: positioning groove; 216: second step groove; 30: installation key; 31: body; 311: third side wall; 312: fourth side wall; 313: connecting protrusion; 314: limiting groove; 32: installation portion; 40: electrical connection base; 401: external thread; 402: contact; 403: locking pin; 50: light engine assembly; 51: lamp filament; 52: housing, 53: circuit board; 60: positioning member; 61: limiting portion; 62: positioning protrusion; 63: clamping groove; 70: second diffuser; 71: clamping portion; 72:80: elastic element.

DETAILED DESCRIPTION

The following will provide a clear and complete description of the technical solutions in the embodiments of this application, in conjunction with the accompanying drawings. It is apparent that the described embodiments are only a portion of the embodiments of this application and not all of them. Based on the embodiments in this application, all other embodiments obtained by those skilled in the art without creative efforts also fall within the scope of this application.

In the description of the application, unless otherwise expressly specified and limited, the terms “connected” “coupled” and “fixed” should be understood in a broad sense. For example, they can refer to a fixed connection or a detachable connection or integration; they can refer to a mechanical connection or an electrical connection; they can refer to a direct connection or an indirect connection through an intermediary medium, and can refer to the internal communication between two components or the interaction between two components. For those skilled in the art, the specific meanings of these terms in this application can be understood based on the specific circumstances.

Unless otherwise defined, all technical and scientific terms used in this application have the same meaning as commonly understood by those skilled in the relevant technical field. The terms used in this application are intended to describe specific embodiments and are not meant to limit the scope of the application. The term "and/or" as used in this application includes any and all combinations of one or more of the associated listed items. Below, some embodiments of this application are described in detail in conjunction with the accompanying drawings. Where there is no conflict, the following embodiments and features described therein can be combined with each other.

Figure 1:
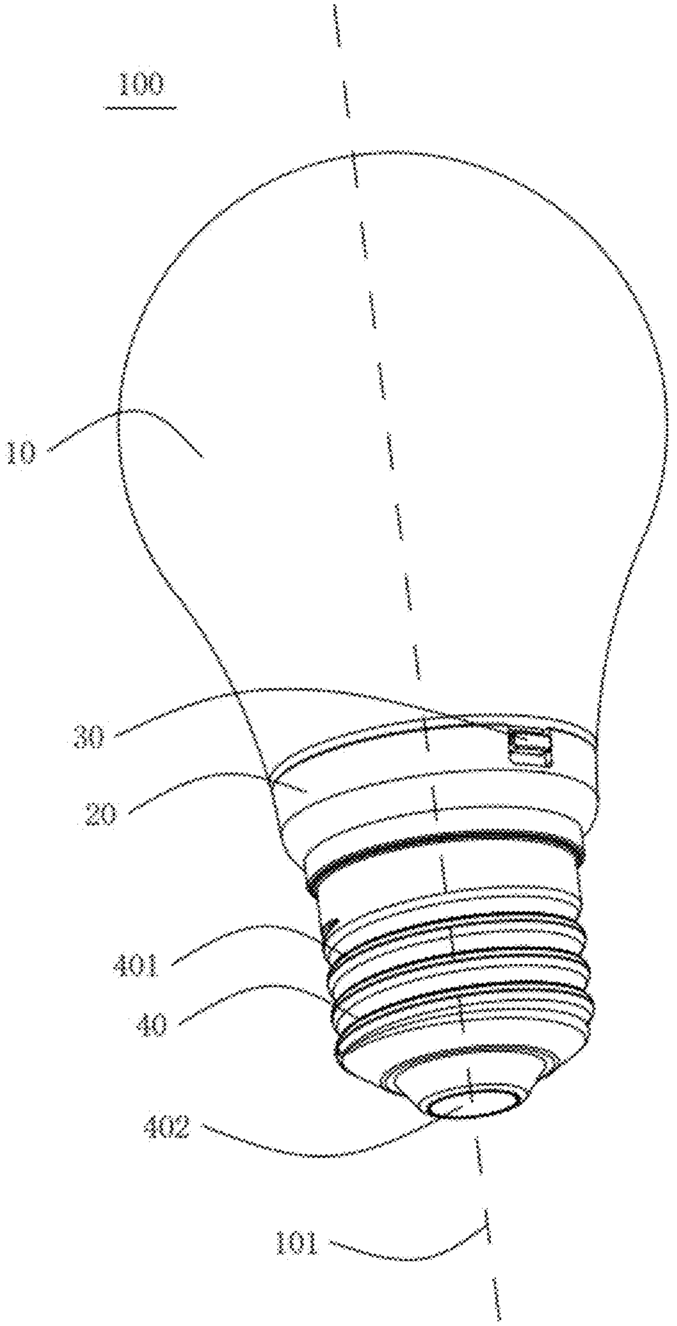
FIG. 1 is a perspective structural diagram of the lighting fixture provided in one embodiment of the present invention.
Figure 2:
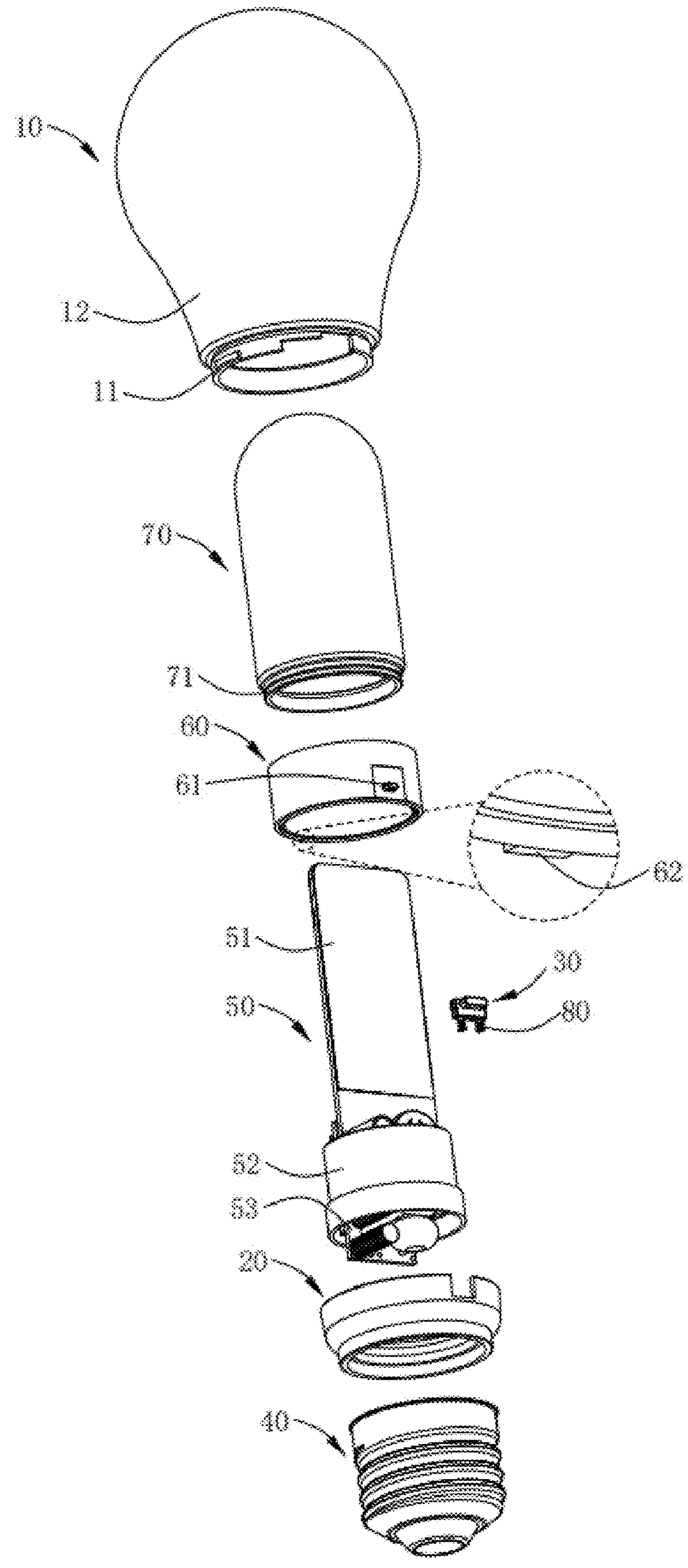
FIG. 2 is an exploded perspective structural diagram of the lighting fixture in FIG. 1.

Referring to FIGS. 1 and 2, the present embodiment provides a lighting fixture 100, including a first diffuser 10, a mounting base 20, an installation key 30, an electrical connection base 40, and a light-emitting assembly 50. Along the direction of the center line 101 of the lighting fixture 100, the first diffuser 10, mounting base 20 and electrical connection base 40 are connected in sequence. The first diffuser 10 is detachably connected to the mounting base 20, the electrical connection base 40 is fixedly connected to an end of the mounting base 20 that is distal to the first diffuser 10, the installation key 30 is positioned on the mounting base 20, the light-emitting assembly 50 is installed within the first diffuser 10 and the mounting base 20. The electrical connection base 40 is used to connect to a power source to supply power to the light-emitting assembly 50.

Figure 3:
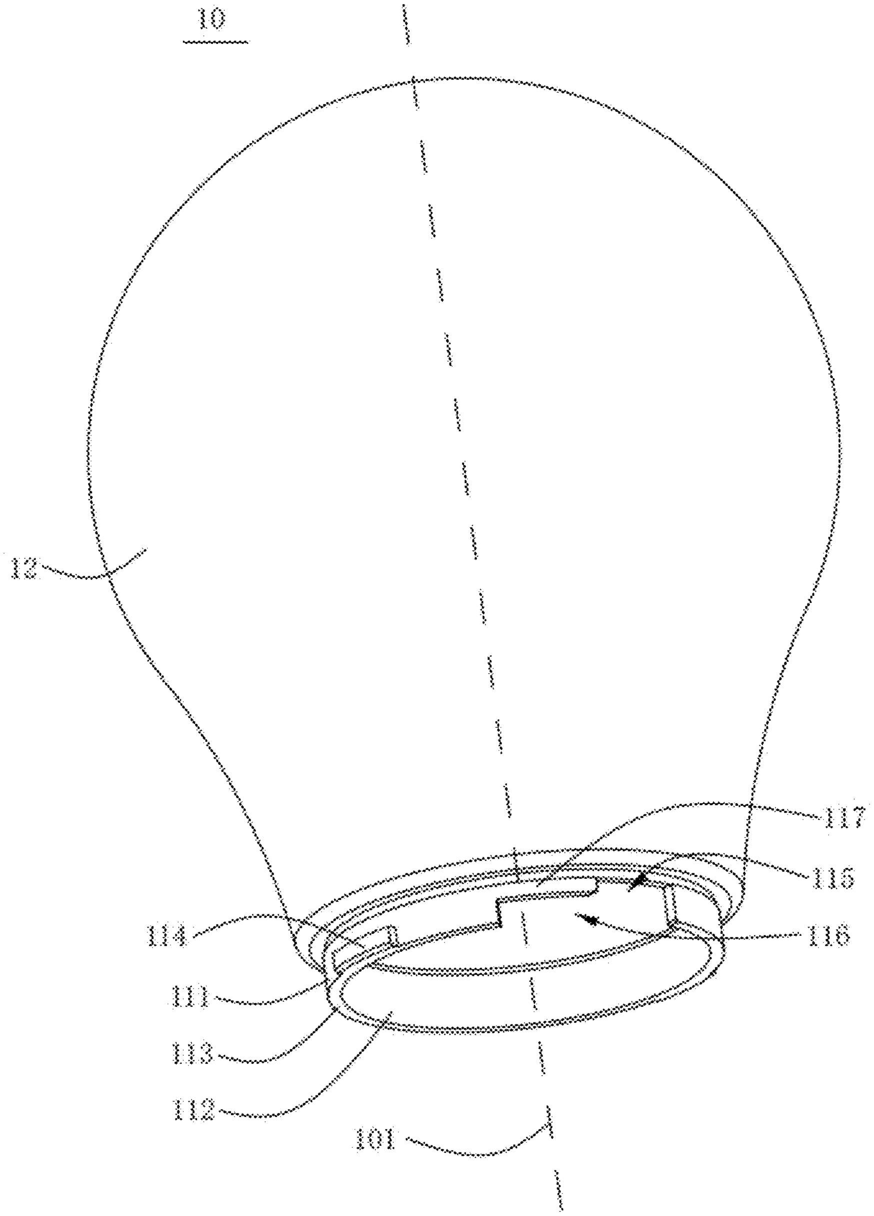
FIG. 3 is a perspective structural diagram of the first diffuser in FIG. 2.

Referring to FIGS. 2 and 3, where FIG. 3 is a schematic diagram of the three-dimensional structure of the first diffuser 10. The first diffuser 10 includes a mounting portion 11 and a casing 12. The mounting portion 11 is fixedly connected to the casing 12 at the end facing the electrical connection base 40. The connection between the mounting portion 11 and the casing 12 can be in various modes, including but not limited to welding, snap-fitting, adhesive bonding, hot melting, threaded connection, integral molding, or a combination thereof.

The orthogonal projection of the mounting portion 11 on a plane perpendicular to the center line 101 of the lighting fixture 100 is in annular shape. The mounting portion 11 includes an outer wall surface 111, an inner wall surface 112, and a first connecting section 113 connected between the outer wall surface 111 and the inner wall surface 112. The outer wall surface 111 and the inner wall surface 112 are coaxial, with the diameter of the outer wall surface 111 being larger than that of the inner wall surface 112.

The casing 12 is capable of adjusting the uniformity, illumination intensity and/or color of the light emitted by the light-emitting assembly 50. In some embodiments, the casing 12 can diffuse the light emitted by the light-emitting assembly 50, allowing the light to spread over a wider angle, thereby achieving a broader illumination effect. The casing 12 can convert a point light source into a surface light source, making the light more uniformly illuminate the target area, providing a more comfortable lighting experience. The casing 12 can be made from materials such as acrylic, polycarbonate, or polystyrene, and it may also have a coating applied to its inner or outer surface to help diffuse the light source. In some embodiments, the casing 12 can focus the light emitted by the light-emitting assembly 50 into a high-intensity beam, enhancing the illumination intensity and thereby improving the lighting effect. In certain embodiments, the surface of the casing 12 may be covered with coatings of different colors to allow the light-emitting assembly 50 to emit light of various colors. In this embodiment, the casing 12 is pear-shaped; however, in other examples, the casing 12 could be spherical, ellipsoidal, or any other suitable shapes.

Figure 4:
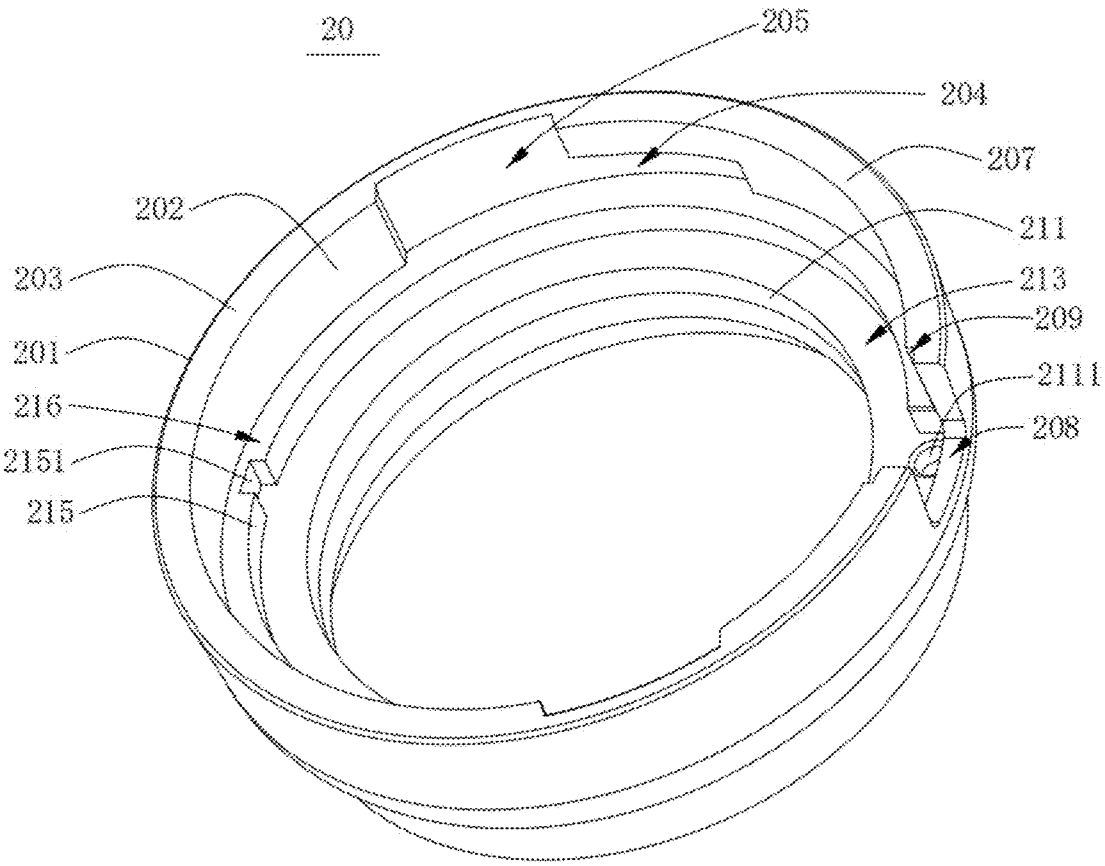
FIG. 4 is a perspective structural diagram of the mounting base in FIG. 2.

Referring to FIGS. 2 and 4, where FIG. 4 is a schematic diagram of the three-dimensional structure of the mounting base 20. The orthogonal projection of the mounting base 20 on a plane perpendicular to the center line of the lighting fixture 100 is in annular shape. The mounting base 20 includes a first side wall surface 201 and a second side wall surface 202, and a second connecting section 203 between the first side wall surface 201 and the second side wall surface 202. The first side wall surface 201 and the second side wall surface 202 are coaxial, with the diameter of the first side wall surface 201 being larger than that of the second side wall surface 202, in other words, the first side wall surface 201 is located outside relative to the second side wall surface 202.

In some embodiments, referring to FIGS. 2 to 4, the mounting base 20 can be rotatably fitted over the mounting portion 11. The connection between the mounting base 20 and the mounting portion 11 is achieved through the cooperation of a locking portion and a locking groove, allowing the first diffuser 10 to be mounted onto the mounting base 20. Specifically, the outer wall surface 111 of the mounting portion 11 is protruded to have a locking portion 114, while the second side wall surface 202 of the mounting base 20 is recessed to form a locking groove 204. The locking portion 114 is configured for being positioned at the locking groove 204 to enable the first diffuser 10 to be securely mounted onto the mounting base 20.

In other examples, the outer wall surface 111 of the mounting portion 11 is recessed to form a locking groove, while the second side wall surface 202 of the mounting base 20 is protruded to have a locking portion. The locking portion 114 is positioned at the locking groove 204, allowing the first diffuser 10 to be mounted onto the mounting base 20. In other embodiments, the locking groove 204 may also penetrate through both the first side wall surface 201 and the second side wall surface 202.

The mounting portion 11 is configured with a locking notch 115, which extends through both the outer wall surface 111 and the inner wall surface 112. The installation key 30 is movably positioned through the locking notch 115 such that the installation key 30 can slide relative to the mounting portion 11 along the direction of the center line 101 of the lighting fixture 100. The installation key 30 has a locked state and an unlocked state. In the locked state, the installation key 30 moves along the center line 101 of the lighting fixture 100 towards the casing 12, sliding into the locking notch 115 and positioning within the locking notch 115. The locking portion 114 is positioned in the locking groove 204, with the mounting portion 11 of the first diffuser 10 pressing against the installation key 30, the first diffuser 10 cannot rotate about the mounting base 20 and is locked in place, being fixedly connected to the mounting base 20. In the unlocked state, the installation key 30 moves along the center line 101 of the lighting fixture 100 away from the casing 12, sliding out of the locking notch 115. While the installation key 30 is not in contact with the mounting portion 11 of the first diffuser 10 circumferentially, the first diffuser 10 can rotate about the mounting base 20, the locking portion 114 disengages from the locking groove 204, unlocking the first diffuser 10 from the mounting base 20, allowing the first diffuser 10 to be removed from the mounting base 20. In other examples, the locking notch 115 is not required to extend through both the outer wall surface 111 and the inner wall surface 112. Instead, the locking notch 115 may be recessed into the outer wall surface 111, and the installation key 30 is movably positioned at the locking notch 115.

In other embodiments, the mounting base 20 may also have a locking notch that penetrates through both the first side wall surface 201 and the second side wall surface 202. The installation key 30 is movably positioned through the locking notch 115, allowing it to slide relative to the mounting portion 11 along the center line 101 of the lighting fixture 100. Of course, the locking notch 115 can also be recessed into the first side wall surface 201, and the installation key 30 is movably positioned at the locking notch 115.

In conventional lighting fixtures, whether incandescent lamps, fluorescent lamps, or LED lamps, the lampshade and mounting base are fixedly connected and cannot be detached. If the lampshade needs to be replaced, the entire lighting fixture must be replaced, leading to increased costs.

In contrast, in the lighting fixture 100 provided by this embodiment, the mounting portion 11 and the mounting base 20 are connected through the cooperation of the locking portion 114 and the locking groove 204. Either the mounting portion 11 or the mounting base 20 is configured with a locking notch 115, allowing the installation key 30 to slide relative to the mounting portion 11 along the center line 101 of the lighting fixture 100. This enables the installation key 30 to either position within or disengage from the locking notch 115. The installation key 30 has both a locked state and an unlocked state. In the locked state, the installation key 30 is positioned at the locking notch 115, the locking portion 114 is positioned at the locking groove 204, and the first diffuser 10 is locked relative to the mounting base 20, being fixedly mounted onto the mounting base 20 through the installation key 30. In the unlocked state, the installation key 30 disengages from the locking notch 115, allowing the mounting portion 11 to rotate about the mounting base 20. This disengages the locking portion 114 from the locking groove 204, unlocking the first diffuser 10 from the mounting base 20. The first diffuser 10 can then be easily removed from the mounting base 20 via the installation key 30, making the operation more convenient.

The outer wall surface 111 and the inner wall surface 112 have a certain length extending along the center line 101 of the lighting fixture 100; the length of the outer wall surface 111 is equal to the length of the inner wall surface 112; the first connecting section 113 has a certain thickness in the direction perpendicular to the center line 101 of the lighting fixture 100. The first side wall surface 201 and the second side wall surface 202 of the mounting base 20 have a certain length extending along the center line 101 of the lighting fixture 100, the length of the first side wall surface 201 is equal to the length of the second side wall surface 202, the second connecting section 203 has a certain thickness in the direction perpendicular to the center line 101 of the lighting fixture 100. The diameter of the second side wall surface 202 is larger than the diameter of the outer wall surface 111, and the length of the first side wall surface 201 is greater than the length of the outer wall surface 111, enabling the second side wall surface 202 of the mounting base 20 to match and connect with the outer wall surface 111 of the mounting portion 11. Additionally, when the first diffuser 10 is mounted on the mounting base 20, the mounting portion 11 is not exposed outside of the mounting base 20, resulting in a compact structure for the lighting fixture 100 and reducing the space occupied by the lighting fixture 100.

In some embodiments, the mounting portion 11 can be rotatably fitted onto the mounting base 20. The connection between the mounting base 20 and the mounting portion 11 is achieved through the cooperation of the locking portion and the locking groove, allowing the first diffuser 10 to be mounted onto the mounting base 20. Specifically, the inner wall surface 112 of the mounting portion 11 is protruded to have a locking portion, while the first side wall surface 201 of the mounting base 20 is recessed to form a locking groove. The locking portion 114 is positioned at the locking groove 204, enabling the first diffuser 10 to be mounted onto the mounting base 20. In other embodiments, the inner wall surface 112 of the mounting portion 11 may be recessed to form a locking groove, while the first side wall surface 201 of the mounting base 20 is protruded to have a locking portion. The locking portion 114 is positioned at the locking groove 204, enabling the first diffuser 10 to be mounted onto the mounting base 20.

The mounting portion 11 is configured with a locking notch 115, which extends through both the outer wall surface 111 and the inner wall surface 112. The installation key 30 is movably positioned through the locking notch 115, allowing it to slide relative to the mounting portion 11 along the direction of the center line 101 of the lighting fixture 100. Of course, the locking notch 115 may also be recessed into the outer wall surface 111, with the installation key 30 movably positioned at the locking notch 115. In other examples, the mounting base 20 may also be configured with a locking notch that extends through both the first side wall surface 201 and the second side wall surface 202. The installation key 30 is movably positioned through the locking notch 115, allowing it to slide relative to the mounting portion 11 along the center line 101 of the lighting fixture 100. Of course, the locking notch 115 may also be recessed into the first side wall surface 201, with the installation key 30 movably positioned at the locking notch 115.

The following description will continue to explain the specific structure of the lighting fixture 100 using the example that the mounting base 20 is rotatably fitted onto the mounting portion 11, the outer wall surface 111 of the mounting portion 11 is protruded to have a locking portion 114, the second side wall surface 202 of the mounting base 20 is recessed to form a locking groove 204, and the mounting portion 11 is configured with a locking notch 115.

Referring to FIGS. 2 to 4. In some embodiments, the second side wall surface 202 of the mounting base 20 is further provided with a release groove 205, which is in communication with the locking groove 204. The bottom surface of the release groove 205 and the bottom surface of the locking groove 204 are coplanar, and both surfaces are perpendicular to the center line 101 of the lighting fixture 100. As such, the locking portion 114 can be conveniently positioned at or withdrawn from the locking groove 204 when the first diffuser 10 rotates relative to the mounting base 20. The mounting base 20 further comprises a first end face 207 and a second end face, with both the first end face 207 and the second end face being interconnected between first side wall surface 201 and the second side wall surface 202 of the mounting base 20. Specifically, the first end face 207 is oriented towards the first diffuser 10, while the second end face is oriented away from the first diffuser 10. Additionally, it is noted that the release groove 205 is recessed within the first end face 207 of the mounting base 20.

The locking groove 204 and the first end surface 207 are spaced apart along the center line 101 of the lighting fixture 100, and the release groove 205 penetrates through the first end surface 207.

The mounting portion 11 is also configured with an avoidance notch 116, which is in communication with the locking notch 115. In a locked state of the lighting fixture 100, the installation key 30 is positioned at the locking notch 115, thereby securing the mounting portion 11 relative to the mounting base 20. Consequently, the first diffuser 10 is rendered immobile relative to the mounting base 20 and is firmly affixed thereto. Conversely, in an unlocked state of the lighting fixture 100, the installation key 30 is situated at the avoidance notch 116, enabling the mounting portion 11 to rotate relative to the mounting base 20. This rotation permits the first diffuser 10 to similarly rotate relative to the mounting base 20, thereby facilitating the removal of the first diffuser 10 from the mounting base 20.

The mounting portion 11 is also configured with a stop strip 117. Circumferentially along the mounting portion 11, the stop strip 117 is positioned opposite the locking notch 115. Along the center line 101 of the lighting fixture 100, the avoidance notch 116 and the stop strip 117 are positioned opposite each other, and the avoidance notch 116 is in communication with the locking notch 115, forming an inverted L-shape.

When the installation key 30 slides along the center line 101 of the lighting fixture 100 towards the casing 12 and is positioned at the locking notch 115, the stop strip 117 and the groove side surface of the locking notch 115 clamp the installation key 30. In this state, the first diffuser 10 cannot rotate about the installation key 30, meaning that the first diffuser 10 is locked and cannot rotate about the mounting base 20. At this point, the locking portion 114 is positioned at the locking groove 204, the bottom surface and top surface of the locking groove 204 clamps the locking portion 114, the first diffuser 10 is securely mounted onto the mounting base 20.

When the installation key 30 slides away from the casing 12 along the center line 101 of the lighting fixture 100, it is disengaged from the locking notch 115, the installation key 30 is positioned at the avoidance notch 116, the first diffuser 10 can rotate about the installation key 30, and therefore also can rotate about the mounting base 20. When the first diffuser 10 rotates about the mounting base 20, the locking portion 114 is disengaged from the locking groove 204 and positioned at the release groove 205. Consequently, the first diffuser 10 can slide away from the mounting base 20 along the center line 101 of the lighting fixture 100 so that the first diffuser 10 is removed from the mounting base 20.

In this embodiment, the outer wall surface 111 of the mounting portion 11 is protruded to have two locking portions 114, denoted as the first and second locking portions, which are spaced circumferentially along the outer wall surface 111. The second side wall surface 202 of the mounting base 20 is recessed to form two locking grooves 204 and two release grooves 205. The two locking grooves, denoted as the first and second locking grooves respectively, are spaced circumferentially along the second side wall surface 202. The two release grooves 205, denoted as the first and second release grooves respectively, are spaced circumferentially along the second side wall surface 202. The first locking groove is communicable with the first release groove, and the second locking groove is communicable with the second release groove. When the first locking portion is positioned at the first locking groove, the second locking portion is positioned at the second locking groove; when the first locking portion is positioned at the first release groove, the second locking portion is positioned at the second release groove.

When the installation key 30 slides along the center line 101 of the lighting fixture 100 toward the casing 12 and is positioned at the locking notch 115, the first diffuser 10 cannot rotate about the mounting base 20. In this state, the first locking portion is positioned at the first locking groove, and the second locking portion is positioned at the second locking groove, thereby the first diffuser 10 is secured onto the mounting base 20. When the installation key 30 slides along the center line 101 of the lighting fixture 100 away from the casing 12, the installation key 30 is disengaged from the locking notch 115 and positioned at the avoidance notch 116, the first diffuser 10 can rotate about the mounting base 20, the first locking portion is positioned at the second locking groove and positioned at the second release groove, so that the first diffuser 10 can slide along the center line 101 of the lighting fixture 100 away from the mounting base 20, and thereby the first diffuser 10 is removed from the mounting base 20.

In other examples, the outer wall surface 111 of the mounting portion 11 may include additional locking portions 114, and the second side wall surface 202 of the mounting base 20 may include additional locking grooves 204 and release grooves 205. The number of locking grooves 204 and release grooves 205 may be equal. Each of the numbers of either locking grooves 204 and release grooves 205 may be greater than or equal to the number of locking portions 114.

Figure 5:
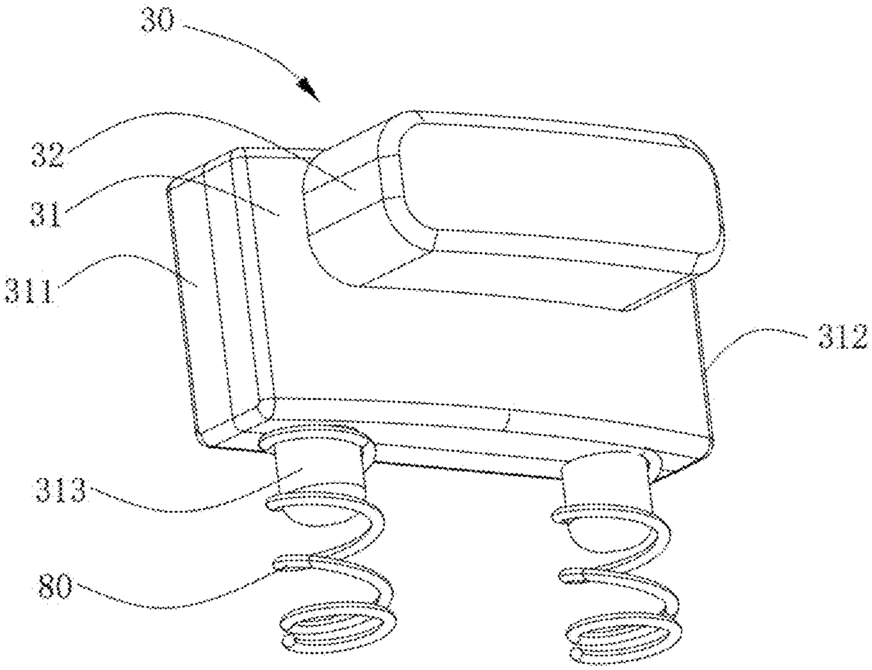
FIG. 5 is a perspective structural diagram of the installation key and the elastic element in FIG. 2.

Referring to FIGS. 4 and 5. The installation key 30 comprises a body 31 and an installation portion 32, wherein the body 31 being fixedly connected to the installation portion 32. In this application, the body 31 is rectangular in shape, and the installation portion 32 protrudes from one of the outer surfaces of the body 31. The mounting base 20 is configured with a mounting notch 208 arranged in the sliding direction of the installation key 30 relative to the mounting portion 11. The mounting notch 208 extends radially through both the inner and outer surfaces of the mounting base 20, that is, extends through the first side wall surface 201 and the second side wall surface 202. The inner surface of the mounting base 20 is configured with a receiving groove 209 communicating with the mounting notch 208.

The width of the receiving groove 209 is greater than the width of the mounting notch 208, the body 31 is positioned at the receiving groove 209, preventing the body 31 of the installation key 30 from detaching from the receiving groove 209. The two side surfaces of the receiving groove 209 can clamp the body 31, preventing the installation key 30 from rotating about the mounting base 20. The installation portion 32 can slidably pass through the mounting notch 208, and extend beyond the mounting notch 208, that is, the installation portion 32 protrudes relative to the first side wall surface 201 of the mounting base 20, so as to facilitate user to toggle the installation portion 32, enabling the installation key 30 to slide along the center line 101 of the lighting fixture 100.

Specifically, the receiving groove 209 includes opposing first and second side surfaces, the body 31 includes opposite third and fourth side wall surfaces 311 and 312. At least portion of the third side wall surface 311 fits snugly against the first side surface of the receiving groove 209, and the fourth side wall surface 312 fits snugly against the second side surface of the receiving groove 209. When the installation key 30 tends to rotate about the mounting base 20, the third side wall surface 311 abuts the first side surface of the receiving groove 209, or the fourth side wall surface 312 abuts the second side surface of the receiving groove 209, so as to prevent the installation key 30 from rotating about the mounting base 20. The third side wall surface 311, fourth side wall surface 312, first side surface and second side surface are all parallel to the center line 101 of the lighting fixture 100. Additionally, the third side wall surface 311 fits smoothly against the first side surface, and the fourth side wall surface 312 fits smoothly against the second side surface, allowing the installation key 30 to slide more smoothly along the center line 101 of the lighting fixture 100.

In some embodiments, the lighting fixture 100 further includes an elastic element 80 having two ends connected to the installation key 30 and the mounting base 20 respectively. The elastic element 80 provides a preload force to the installation key 30 to drive the installation key to move back to an original position. Specifically, the mounting base 20 also includes an annular part 211, which is fixedly connected to the second side wall surface 202 of the mounting base 20 to form a first step groove 213 for receiving the mounting portion 11. The annular part 211 and the installation key 30 are coupled via the clastic element 80. The clastic element 80 includes two connecting ends, each connected to the installation key 30 and the annular part 211, respectively. The elastic element 80 is clamped between the installation key 30 and the annular part 211, with a tendency to exert a push force, thereby providing a preload force to drive the installation key 30 to move back to the original position. Under the push force of the elastic element 80, the installation key 30 is positioned at the locking notch 115, preventing the installation key 30 from disengaging from the locking notch 115, thus avoiding the unlocking of the first diffuser 10 from the mounting base 20.

Figure 7:
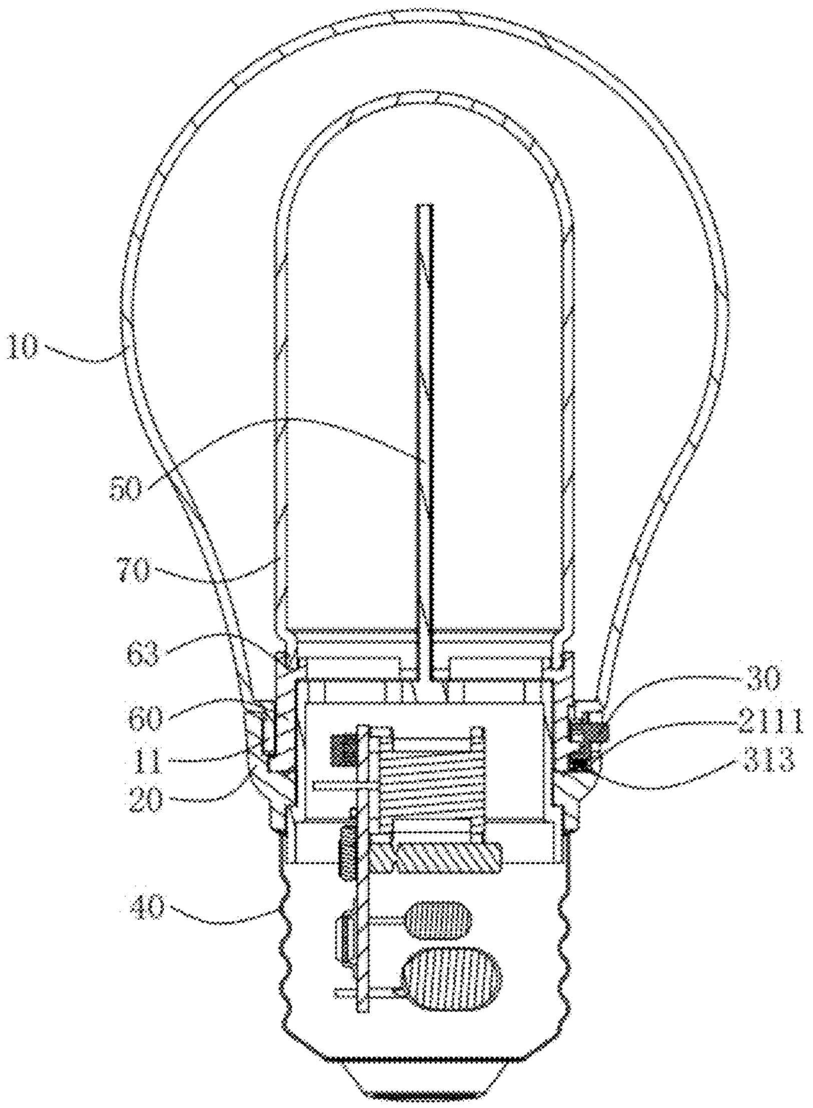
FIG. 7 is a cross-sectional view of the lighting fixture in FIG. 1.

The annular part 211 of the mounting base 20 and the installation key 30 are loosely connected via a connecting protrusion and a connection groove. In this embodiment, the annular part 211 has one side facing the installation key 30 and recessed to form a connection groove 2111, the body 31 of the installation key 30 has one side facing the annular part 211 and protruded to have a connecting protrusion 313, the elastic element 80 is a spring, the elastic element 80 has one end fixedly fitted over the connecting protrusion 313, and another end fixedly connected to the bottom surface of the connection groove 2111, so as to facilitate the elastic element 80 to provide the preload force to the installation key 30. Referring to FIG. 7, the connection groove 2111 and the connecting protrusion 313 are spaciously (or loosely) connected, that is, the aperture of the connection groove 2111 is larger than the outer diameter of the connecting protrusion 313. As such, the elastic element 80 is fitted over the connecting protrusion 313, and both of the elastic element 80 and the connecting protrusion 313 are received in the connection groove 2111.

In other examples, the annular part 211 on the side facing the installation key 30 and protruded to have a connecting protrusion 313, the body 31 of the installation key 30 has one side facing the annular part 211 and recessed to form a connection groove 2111. The element 80 has one end fixedly fitted onto the connecting protrusion 313, and the other end fixedly connected to the bottom surface of the connection groove 2111, so as to facilitate the elastic element 80 to provide a preload force to the installation key 30.

Figure 6:
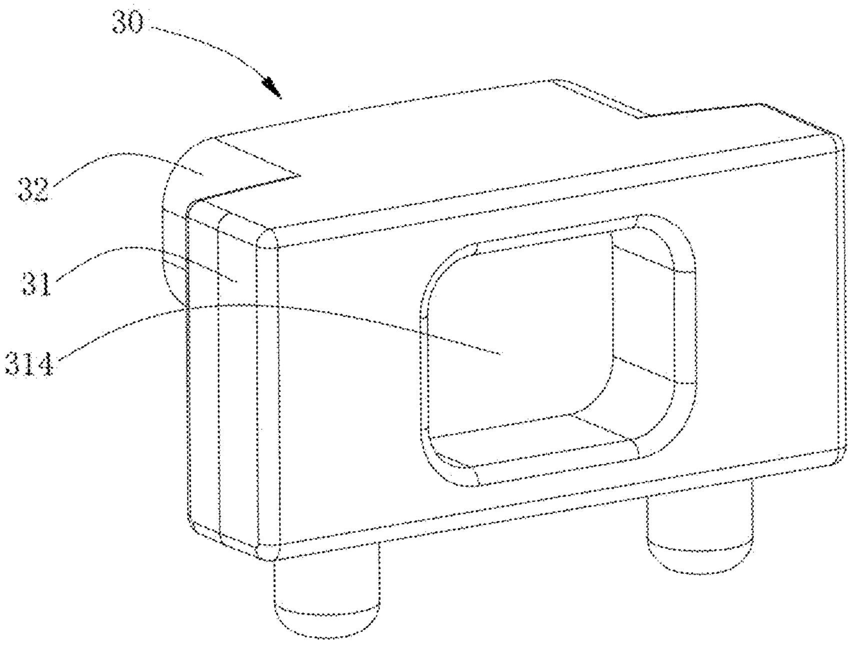
FIG. 6 is another perspective structural diagram of the installation key in FIG. 5.

Referring to FIGS. 2, 6, and 7. In some embodiments, the lighting fixture 100 further includes a positioning member 60. The position member 60, the mounting portion 11 and the mounting base 20 are sequentially stacked, wherein the mounting base 20 is positioned on the outer side relative to the mounting portion 11, the positioning member 60 is positioned on the inner side relative to the mounting portion 11, the mounting portion 11 is configured between the outer wall surface of the positioning member 60 and the second side wall surface 202 of the mounting base 20. The positioning member 60 and the installation key 30 are connected via a limiting groove and a limiting portion to restrict the sliding travel of the installation key 30 relative to the mounting base 20.

In this example, the body 31 of the installation key 30 has one side that is facing away from the installation portion 32 and recessed to form a limiting groove 314. The outer wall surface of the positioning member 60 is protruded to have a limiting portion 61. The limiting portion 61 can be slidably positioned at the limiting groove 314 along the center line 101 of the lighting fixture 100, thereby restricting the sliding travel of the installation key 30 relative to the mounting base 20. Specifically, a length of the limiting portion 61 along the center line 101 of the lighting fixture 100 is less than a length of the limiting groove 314 along the center line 101 of the lighting fixture 100, so that the limiting portion 61 can slide within the limiting groove 314 along the center line 101. A width of the two side surfaces of the limiting portion 61 is less than a width of the two groove side surfaces of the limiting groove 314. It should be understood that the two side surfaces of the limiting portion 61 can also smoothly fit against the two groove side surfaces of the limiting groove 314, so that the two groove side surfaces can prevent the limiting portion 61 from sliding relative to the limiting groove 314 in a direction perpendicular to the center line 101 of the lighting fixture 100.

In other examples, the body 31 of the installation key 30 has one side that is facing away from the installation portion 32 and protruded to have a limiting portion, and the outer wall surface of the positioning member 60 is recessed to form a limiting groove, so that the limiting portion can be slidably positioned at the limiting groove along the center line 101 of the lighting fixture 100 to restrict the sliding travel of the installation key 30 relative to the mounting base 20.

In some embodiments, the mounting base 20 further includes a connecting element 215. The connecting element 215 is annular in shape. The connecting element 215 is positioned on the inner wall surface of the mounting base 20, that is, the connecting element 215 is fixedly connected to the second side wall surface 202 of the mounting base 20 to form a second step groove 216 to receive the positioning member 60. The connecting element 215 and the annular part 211 are stacked along the center line 101 of the lighting fixture 100, the connecting element 215 is positioned closer to the first diffuser 10 relative to the annular part 211. The inner diameter of the connecting element 215 is smaller than the inner diameter of the annular part 211. As shown in FIG. 4, the second side wall surface 202 of the mounting base 20, together with the top surface of the connecting element 215, forms an L-shaped second step groove 216. The second step groove 216 is used for receiving the mounting portion 11 of the first diffuser 10. The inner side surface of the connecting element 215 and the top surface of the annular part 211 form an L-shaped first step groove 213. The first step groove 213 is used for receiving the positioning member 60.

Referring to FIGS. 2 and 4, the positioning member 60 and the connecting piece 215 are connected through the cooperation of a positioning protrusion and a positioning groove to prevent the positioning member 60 from rotating about the mounting base 20. In this example, the inner surface of the connecting piece 215 is recessed to form a positioning groove 2151, and the outer wall surface of the positioning member 60 is provided with a positioning protrusion 62. The positioning protrusion 62 is positioned in the positioning groove 2151, and the two side surfaces of the positioning groove 2151 abut against the positioning protrusion 62 to prevent the positioning member 60 from rotating about the mounting base 20. In other examples, the inner surface of the connecting piece 215 is provided with a positioning protrusion, while the outer wall surface of the positioning member 60 is recessed to form a positioning groove. The positioning protrusion is positioned in the positioning groove, and the two side surfaces of the positioning groove abut against the positioning protrusion to prevent the positioning member 60 from rotating about the mounting base 20.

In some embodiments, the lighting fixture 100 further includes a second diffuser 70. The first diffuser 10 is fitted over the second diffuser 70. The second diffuser 70 and the positioning member 60 are connected through the cooperation of a snap-in groove and a snap-in portion, so that the second diffuser 70 is mounted on the positioning member 60. In this example, one end of the second diffuser 70 facing the positioning member 60 is provided with a snap-in portion 71, and one end of the positioning member 60 facing the second diffuser 70 is recessed to form a snap-in groove 63. The snap-in portion 71 can be positioned in the snap-in groove 63, so that the second diffuser 70 is mounted on the positioning member 60.

Figure 9:
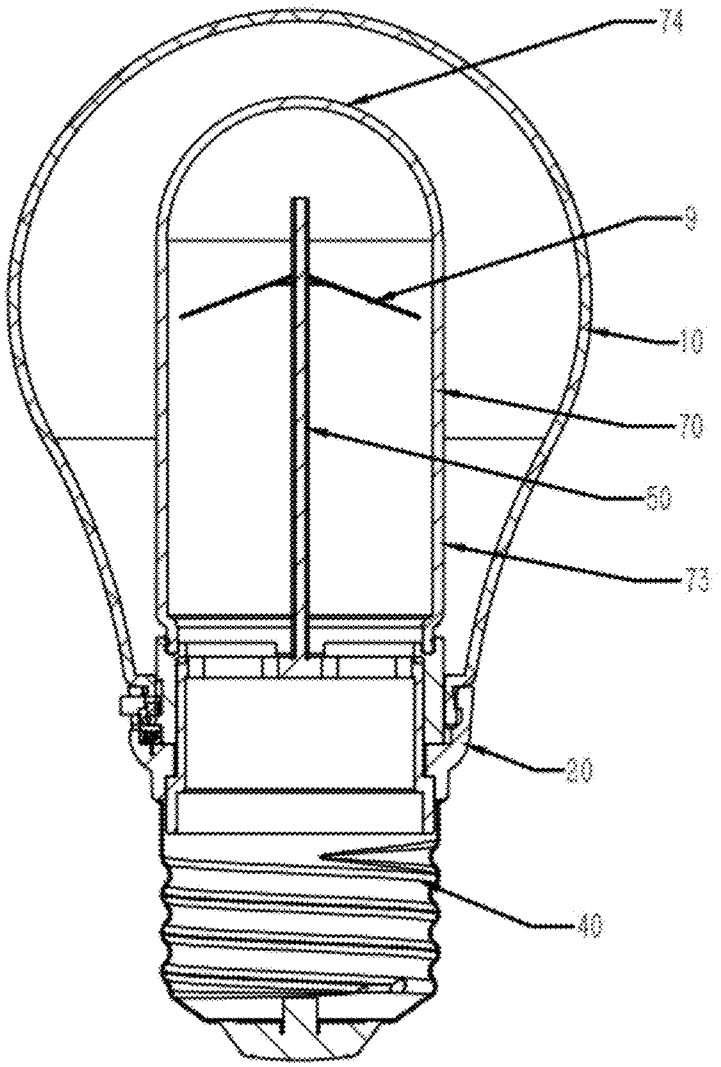
FIG. 9 is a perspective structural diagram of the lighting fixture provided in another embodiment of the present invention.
Figure 10:
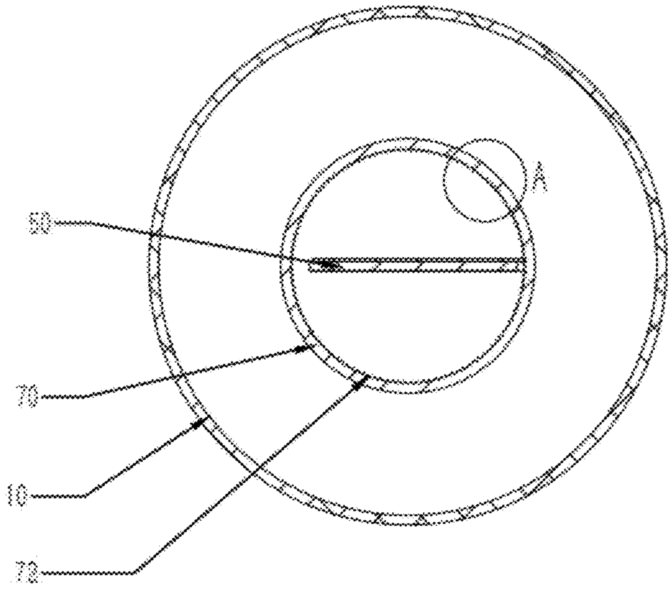
FIG. 10 is a cross-sectional view of the lighting fixture provided in the embodiment.
Figure 11:
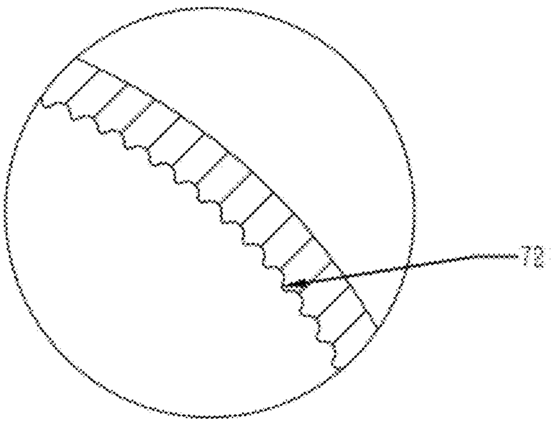
FIG. 11 is a partial enlarged view of part A of the lighting fixture provided in another embodiment of FIG. 10.

Referring to FIGS. 9, 10 and 11, the volume the first diffuser10 is bigger than that of the second diffuser 70, and the second diffuser 70 includes a vertical portion 73 and a dome-shaped portion 74. The vertical portion 73 includes an inner teeth profile 72 for enhancing light diffusion.

In other examples, the light engine assembly 50 includes a LED 51 and a reflector 9. Both of the LED 51 and reflector 9 are mounted to a printed circuit board 53. The reflector 9 is positioned beneath the LED. The dome-shaped portion 74 is positioned above and on top of the light engine assembly 50.

In other examples, one end of the second diffuser 70 facing the positioning member 60 is recessed to form a snap-in groove, and one end of the positioning member 60 facing the second diffuser 70 is provided with a snap-in portion. The snap-in portion can be positioned in the snap-in groove so that the second diffuser 70 is mounted on the positioning member 60.

In some embodiments, the lighting fixture can omit the first diffuser 10, leaving only the second diffuser 70, which also serves to diffuse or concentrate the light source.

The light-emitting assembly 50 is installed inside the second diffuser 70. In this example, the light-emitting assembly 50 includes a lamp filament 51, a housing 52, and a circuit board 53. The lamp filament 51 is installed inside the housing 52. The lamp filament 51 is used for emitting light, the housing 52 is used to protect and fix the lamp filament 51, and the circuit board 53 serves as a circuit substrate for the light-emitting assembly 50. The circuit board 53 is connected to the electrical connection base 40 to supply power for the lamp filament 51 to emit light.

The circuit board 53 is configured with different LED chips that produce different colors of light. Optionally, the different LED chips can produce various combinations of colors, including red, green, blue, amber, and mint.

In this embodiment, referring to FIG. 1, the electrical connection base 40 is detachably connected to the lamp base through a threaded structure. Specifically, the outer wall surface of the electrical connection base 40 is provided with external threads 401, and one end of the electrical connection base 40 facing away from the first diffuser 10 is provided with a contact 402. The neutral wire of the lamp base is connected to the external threads 401, and the live wire of the lamp base is connected to the contact 402. The contact 402 is connected to the circuit board 53 via a wire, supplying power for the lamp filament 51 to emit light.

Figure 8:
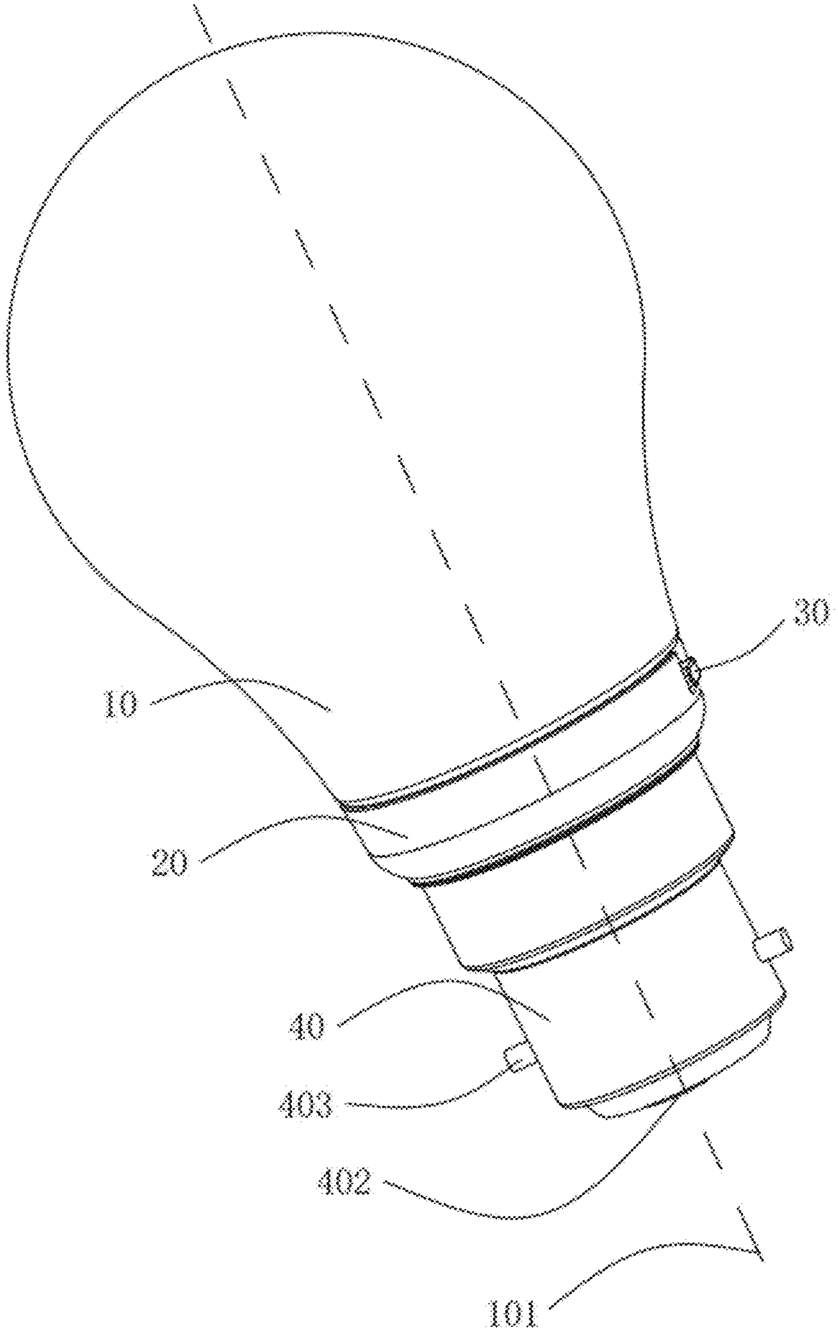
FIG. 8 is a perspective structural diagram of the lighting fixture provided in another embodiment of the present invention.

In other examples, referring to FIG. 8, the electrical connection base 40 is detachably connected to the lamp base via a locking pin 403. Specifically, the outer wall surface of the electrical connection base 40 is protruded to have a locking pin 403, and one end of the electrical connection base 40 facing away from the first diffuser 10 is provided with a contact 402. The lamp base includes a first slot and a second slot, which are in L-shaped connection. The first slot extends along the center line 101 of the lighting fixture 100, and the second slot extends perpendicularly to the center line 101 of the lighting fixture 100. The locking pin 403 is positioned in the second slot and rotates around the center line 101 of the lighting fixture 100 to fix the electrical connection base 40 to the lamp base. The neutral wire of the lamp base is connected to the locking pin 403, and the live wire of the lamp base is connected to the contact 402. The contact 402 is connected to the circuit board 53 via a wire, supplying power for the lamp filament 51 to emit light.

In this example, the circuit board 53 includes a power conversion module, a wireless RF module, an optical control interface, a processor, and an LED driver. The power conversion module is used to convert electrical energy into the required power output and provides stable, high-quality power conversion and protection functions, supporting the stable light emission of various lighting fixtures 100. The wireless RF module is used to receive RF signals and convert them into digital signals. The LED driver performs operations corresponding to the digital signals, such as turning on the lighting fixture 100, turning off the lighting fixture 100, or adjusting brightness of the lighting fixture 100. The optical control interface can detect external optical control signals to control the lighting fixture 100.

The operation method for disassembly the first diffuser 10 of the lighting fixture 100 provided in this application embodiment is as follows: moving the installation key 30 along the center line 101 of the lighting fixture 100 in the direction away from the casing 12; sliding the installation key 30 out of the locking notch 115; positioning the installation key 30 in the avoidance notch 116 so that the installation key 30 does not abut against the mounting portion 11 of the first diffuser 10 in the circumferential direction and is in an unlocked state; rotating the first diffuser 10 about the mounting base 20; rotating the first diffuser 10 about the mounting base 20 to disengage the locking portion 114 from the locking groove 204 and position the locking portion 114 in the release groove 205; sliding the first diffuser 10 along the center line 101 of the lighting fixture 100 in the direction away from the mounting base 20 to disassemble the first diffuser 10 from the mounting base 20.

The operation method for installing the first diffuser 10 of the lighting fixture 100 provided in this application embodiment is as follows: positioning the locking portion 114 of the mounting portion 11 in the release groove 205; moving the installation key 30 along the center line 101 of the lighting fixture 100 in the direction away from the casing 12 so that the installation key 30 is in an unlocked state; rotating the first diffuser 10 about the mounting base 20; rotating the first diffuser rotates about the mounting base 20 to disengage the locking portion 114 from the release groove 205 and position the locking portion 114 in the locking groove 204; sliding the installation key 30 out of the avoidance notch 116; positioning the installation key 30 in the locking notch 115 such that the installation key 30 is at the locking state and the first diffuser 10 is installed onto the mounting base 20.

In the description of this application embodiment, it should be noted that terms like “center,” “upper,” “lower,” “left,” “right,” “vertical,” “horizontal,” “inner,” “outer,” and other directional or positional indicators are based on the orientation or positional relationships described in the accompanying drawings. They are merely intended to simplify the description and are not meant to indicate or imply that the devices or components referred to must have specific orientations or be constructed and operated in specific orientations. Therefore, they should not be interpreted as limiting the scope of this application.

The above disclosure is merely a preferred embodiment of this application and should not be construed as limiting the scope of the claims of this application. Those skilled in the art should be able to understand and implement the whole or portion of the processes described in the embodiments above and still fall within the scope covered by this application according to the equivalent changes made in the claims of this application.

What is claimed is:

1. A lighting fixture, characterized in that, the lighting fixture includes a first diffuser, a mounting base, and an installation key;

the first diffuser includes a mounting portion connected to the mounting base by coupling a locking portion and a locking groove;

the installation key is configurable to slide longitudinally relative to the mounting portion to switch between a locked state and an unlocked state;

when in the locked state, the installation key is positioned at a locking notch configured in the mounting portion or the mounting base, the locking portion is positioned in the locking groove so that the first diffuser is locked to the mounting base; and when in the unlocked state, the installation key is unlocked from the locking notch to allow the mounting portion to rotate about the mounting base to disengage the locking portion from the locking groove so that the first diffuser is unlocked from the mounting base.

2. The lighting fixture according to claim 1, wherein:

an inner wall surface of the mounting base is provided with a release groove communicable with the locking groove;

the locking portion is formed on an outer wall surface of the mounting portion;

the mounting base includes an end surface facing the first diffuser;

the locking groove and the end surface are spaced apart;

the release groove passes through the end surface;

the locking portion is configurable to rotate with the mounting portion about the mounting base to move between the locking groove and the release groove; and when the locking portion moves to the release groove, the first diffuser can be detached from the mounting base.

3. The lighting fixture according to claim 1, wherein:

the mounting portion is further provided with an avoidance notch communicable with the locking notch;

in the locked state, the installation key is positioned at the locking notch, and the mounting portion is locked to the mounting base; and in the unlocked state, the installation key is positioned at the avoidance notch to allow the mounting portion to rotate about the mounting base.

4. The lighting fixture according to claim 1, wherein:

the mounting portion is further provided with a stop strip opposite to the locking notch along a circumferential direction of the mounting portion;

when the installation key is positioned at the locking notch, the stop strip abuts the installation key, the first diffuser is locked to the mounting base; and when the installation key is disengaged from the locking notch, movements of the stop strip and the installation key are independent, allowing the mounting portion to rotate about the mounting base.

5. The lighting fixture according to claim 1, wherein:

the mounting base is provided with a mounting notch along a sliding direction of the installation key relative to the mounting portion, wherein the mounting notch passes through the inner and outer wall surfaces of the mounting base in a radial direction;

the inner wall surface of the mounting base is provided with a receiving groove communicable with the mounting notch, wherein the receiving groove has a width greater than a width of the mounting notch; and the installation key includes an installation portion and a body connected to the installation portion, wherein the installation portion is configurable to slide through the mounting notch; and the body is slidably disposed in the receiving groove and configurable to be inserted into or disengaged from the locking notch.

6. The lighting fixture according to claim 1, wherein:

the lighting fixture further includes an elastic element having two ends respectively connected to the installation key and the mounting base; and the elastic element provides a preloading force to the installation key to drive the installation key to move back to an original position.

7. The lighting fixture according to claim 6, wherein:

the installation key and the mounting base are connected through a connecting protrusion and a connection groove; and the elastic element has one end fixedly fitted over the connecting protrusion; and has another end fixedly connected to a bottom surface of the connection groove.

8. The lighting fixture according to claim 1, wherein:

the lighting fixture further includes a positioning member sequentially stacked and connected with the mounting portion and the mounting base; and the positioning member and the installation key are connected by coupling a limiting groove and a limiting portion to restrict a sliding travel of the installation key relative to the mounting base.

9. The lighting fixture according to claim 8, wherein:

the mounting base further includes a connecting element configured on the inner wall surface of the mounting base; and the positioning member and the connecting element are connected by coupling a positioning protrusion and a positioning groove to prevent the positioning member from rotating about the mounting base.

10. The lighting fixture according to claim 8, wherein:

the lighting fixture further includes a second diffuser;

the first diffuser is fitted over the second diffuser; and the second diffuser and the positioning member are connected by coupling a clamping groove and a clamping portion to position the second diffuser on the positioning member.

11. A lighting fixture, comprising:

a first diffuser, a second diffuser, a mounting base, an installation key, an electrical connection base and a light engine assembly;

wherein the light engine assembly is fixed on the electrical connection base and the mounting base is arranged on the electrical connection base;

wherein the second diffuser is fixed on the mounting base to cover the light engine assembly;

the first diffuser is detachably connected to the mounting base through the installation key:

the first diffuser includes a mounting portion connected to the mounting base by coupling a locking portion and a locking groove; and the installation key is configurable to slide longitudinally relative to the mounting portion to switch between a locked state and an unlocked state.

12. The lighting fixture according to claim 11, wherein:

when in the locked state, the installation key is positioned at a locking notch formed in the mounting portion or the mounting base, and the locking portion is engaged in the locking groove, thereby locking the first diffuser to the mounting base; and when in the unlocked state, the installation key is unlocked from the locking notch to allow the mounting portion to rotate about the mounting base to disengage the locking portion from the locking groove so that the first diffuser is unlocked from the mounting base.

13. The lighting fixture according to claim 12, wherein:

the locking portion is formed on the outer surface of the mounting portion, the locking groove is formed on the inner surface of the mounting base;

an inner wall surface of the mounting base is provided with a release groove communicable with the locking groove;

the locking portion is configurable to rotate with the mounting portion about the mounting base to move between the locking groove and the release groove; and when the locking portion moves to the release groove, the first diffuser can be detached from the mounting base.

14. The lighting fixture according to claim 12, wherein:

the mounting portion is further provided with an avoidance notch communicable with the locking notch;

in the locked state, the installation key is positioned at the locking notch, and the mounting portion is locked to the mounting base; and in the unlocked state, the installation key is positioned at the avoidance notch to allow the mounting portion to rotate about the mounting base.

15. The lighting fixture according to claim 14, wherein:

the mounting portion is further provided with a stop strip opposite to the locking notch along a circumferential direction of the mounting portion;

when the installation key is positioned at the locking notch, the stop strip abuts the installation key, the first diffuser is locked to the mounting base; and when the installation key is disengaged from the locking notch, movements of the stop strip and the installation key are independent, allowing the mounting portion to rotate about the mounting base.

16. The lighting fixture according to claim 12, wherein:

the lighting fixture further includes an elastic element having two ends respectively connected to the installation key and the mounting base; and the elastic element provides a preloading force to the installation key to drive the installation key to move back to an original position.

17. The lighting fixture according to claim 16, wherein:

the installation key and the mounting base are connected through a connecting protrusion and a connection groove; and the elastic element has one end fixedly fitted over the connecting protrusion; and has another end fixedly connected to a bottom surface of the connection groove.

18. The lighting fixture according to claim 11, wherein:

a volume of the first diffuser is bigger than a volume of the second diffuser, and the second diffuser includes a vertical portion and a dome-shaped portion, and the vertical portion including an inner teeth profile for enhancing light diffusion.

19. The lighting fixture according to claim 18, wherein:

the light engine assembly includes a LED and a reflector both mounted to a printed circuit board;

the reflector is positioned beneath the LED; and the dome-shaped portion is positioned above and on top of the light engine assembly.

* * * * *